July 22, 1952          A. F. SISKOFF          2,603,829
FISH HOLDING IMPLEMENT
Filed May 10, 1949
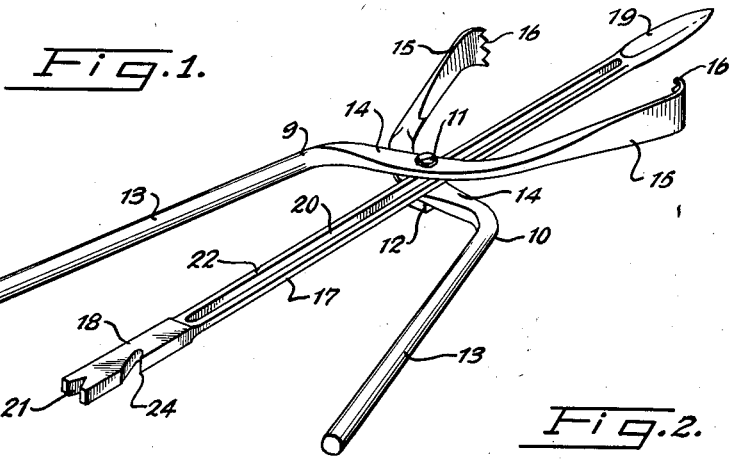
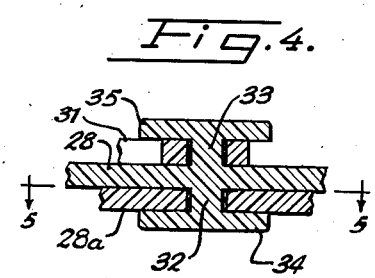
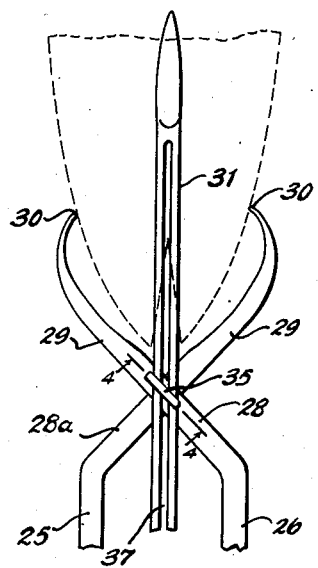
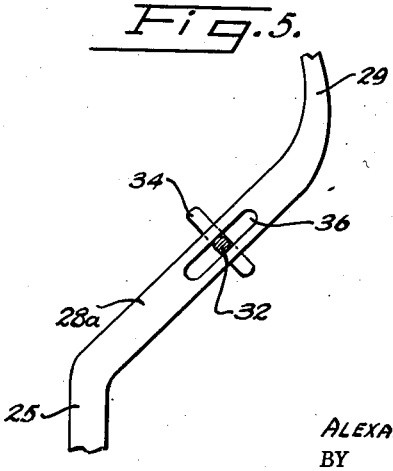
INVENTOR.
ALEXANDER F. SISKOFF.
BY
*Shoemaker & Mattare*
ATTORNEYS Patented July 22, 1952

2,603,829

UNITED STATES PATENT OFFICE 2,603,829

FISH HOLDING IMPLEMENT

Alexander F. Siskoff, New Prague, Minn., assignor of one-half to John Sturner, New Prague, Minn.

Application May 10, 1949, Serial No. 92,403

6 Claims. (Cl. 17—8)

This invention relates to an improved implement adapted for holding fish when scaling, scraping and cleaning the same.

The primary object of the invention is to provide an improved implement capable of securely gripping the body of the fish and whereby the fish body can be held with one hand with either side or edge of the fish exposed in a rigid and stable position while it is being scaled and cleaned with the other hand.

Another object of the invention is to provide an improved implement of the character referred to capable of securely gripping fish of different sizes and shapes and that can be easily manipulated to grip the fish and disengaged from the same.

A further object of the invention is to provide an improved implement of the kind mentioned equipped with simple, efficient fish-hook removing means.

The invention, with other objects, novel features, and advantages thereof and the particular construction, combination and arrangement of parts comprising the same will be understood from the following detailed description when considered in connection with the accompanying drawings forming part hereof and illustrating a preferred embodiment of the invention and a modified form thereof.

In the drawings:

Fig. 1 is a perspective view of a fish holding implement constructed in accordance with the present invention;

Fig. 2 is a detail plan view of one of the holding members of the implement;

Fig. 3 is a fragmentary plan view of a modified form of the implement, the same being shown in operative engagement with the body of a fish, the latter being illustrated by broken lines;

Fig. 4 is a detail transverse section to an enlarged scale taken on the line 4—4 of Fig. 3;

Fig. 5 is a detail section on a reduced scale taken on the line 5—5 of Fig. 4 looking in the direction of the arrows.

While two preferred embodiments of the invention are illustrated in the drawings, it will be understood that minor changes and modifications may be made in the particular constructions shown, and the invention may be embodied in other forms as will appeal to those skilled in the art and falling within the scope of the appended claims without departing from the spirit of the invention.

Referring to a detailed description of the particular embodiment of the invention illustrated in Figs. 1 and 2 of the drawing, the fish holding implement comprises a pair of clamping levers 9 and 10 pivotally connected intermediate their ends by a pivot bolt 11 and nut 12. The clamping levers have handle portions 13, flat sided, curved, fulcrumed portions 14 extending at an angle to the handle portions 13, and outer jaws 15 of flat formation terminating in inwardly directed transversely extending toothed gripping edges 16, said levers being arranged with their fulcrumed portions 14 extending in opposite directions.

The implement also includes a rigid, elongated holding member or stem 17 extending longitudinally of the pair of clamping levers 9 and 10 and connected therewith at the pivotal axis thereof for bodily longitudinal movement relatively thereto.

The elongated holding member or stem 17, which is provided with a handle portion 18 at its inner end and a pointed outer end portion 19, is connected to the pair of clamping levers 9 and 10 by the pivot bolt 11, said elongated member or stem having a longitudinal slot 20 therein engaging the pivot bolt 11 and being disposed between opposing flat side faces of the clamping levers, the elongated member or stem extending between the gripping edges 16 of the jaws 15 of the clamping levers.

The elongated member or stem 17 is of a length to extend beyond the gripping edges 16 of the jaws 15 when the parts are in the position shown in Fig. 1. The slot 20 in the elongated member or stem 17 extends from the handle portion 18 to the pointed end portion 19 providing for shifting said elongated member or stem longitudinally to position the same with its pointed end portion 19 disposed different distances beyond the gripping edges 16 of the jaws 15 and also with the pointed end portion 19 positioned inwardly of the gripping jaws 15.

In the use of the implement, the toothed gripping edges 16 of the jaws 15 of the clamping levers 9 and 10, are positioned at opposite sides of the head of a fish and the handle portions 13 of the clamping levers pressed inwardly so that the gripping edges 16 firmly grip the fish.

The elongated holding member or stem 17 is then pushed forwardly into the throat of the fish and into its body a few inches making for further rigidity, the stem being shifted longitudinally in accordance with the size of the fish. The fish is thus securely gripped by the implement and, by holding onto the handle portions 13 of the clamping levers with one hand, the fish is held with a firm and rigid grip so that it can be placed on a working surface and held flat, on edge or any desired position for scaling and cleaning.

When the fish has been scaled, the elongated member or stem 17 is withdrawn from the fish to a position inwardly of the gripping edges 16, and the head of the fish is then severed from the body while the same is being still gripped by the jaws 15 of the clamping levers, the head of the fish being afterwards freed from the jaws 15 of the clamping levers by spreading the handle portions 13.

The implement is provided with fish-hook removing means comprising a V-shaped notch 21 in the outer end of the handle portion 18 of the elongated member or stem 17, and a narrow slit 22 in said member extending inwardly from one side face thereof forwardly of the handle portion. By inserting the handle portion 13 of the stem 17 into a fish's mouth, and engaging the notched portion 21 with the bight or connecting loop of a fish-hook engaged with the fish, and then inserting a portion of the fishing line leading from the hook into said narrow slit 22 so that it is held taut, the barb of the hook can then be pushed free from engagement with the fish body, and the hook being tightly held in the notched portion 22 of the stem 17, can then be readily removed.

The elongated member or stem 17 may also be provided with a curved slot 23 extending inwardly from one side face of the handle portion 18 thereof to form a hook portion 24 adapted to remove caps from bottles.

The pair of clamping levers 9 and 10, and the elongated rigid holding member or stem 17 are preferably made of metal but may be constructed of plastic or any other suitable material. The modified form of the implement illustrated in Figs. 3, 4 and 5 of the drawings, is particularly adapted to be made of plastic material. The modified form of device illustrated in these views, like the construction hereinbefore described and illustrated in Figs. 1 and 2, comprises a pair of clamping levers 25 and 26 pivotally connected intermediate their ends, and said levers having handle portions at their inner ends, intermediate fulcrum portions 28, 28a and outer cooperating gripping jaws 29, the latter having inwardly directed toothed gripping portions 30.

This modified form of the device also includes an elongated rigid holding member or stem 31 that is connected with the pair of levers at the pivotal axis thereof for bodily longitudinal movement relatively thereto.

In this modified construction, one of the levers 26 has pins 32 and 33 projecting laterally from opposite sides of its fulcrum portion 28, each of said pins having an enlarged oblong shaped head designated respectively 34 and 35. The other lever 25 is provided in its fulcrum portion 28a with an oblong shaped aperture 36 of a size corresponding to the size of the enlarged head 34 of the pin 32 to permit the head 34 to be passed therethrough, and the fulcrum portion of the lever engaged with the pin 32.

The elongated member or stem 31 is provided with a longitudinal slot 37 therein, said slot being of a width corresponding to the width of the head 34 of the pin 32 to permit said head to be passed through the slot 37 of the stem and the latter engaged with the pin 32. As illustrated in the drawing, the oblong shaped heads 34, 35 of the pins 32, 33 are so disposed that, when the lever 25 and the stem 31 have been engaged respectively with the pins 33, 32, and said lever and stem are moved to operating position, the slot 36 of the lever 25 and the slot 37 of the stem will be out of register with the heads 34, 35 of the pins 32, 33, and the levers and the elongated member or stem will be detachably connected together for relative movement. In this modified form of the implement, the parts of which can be formed from plastic material by moulding, the handle portions of the clamping levers and the elongated member or stem are slightly enlarged for purposes of rigidity and design, the fulcrum portions 28 of the levers being formed straight instead of curved as in the construction illustrated in Figs. 1 and 2.

What I claim is:

1. An implement for holding fish including a pair of clamping levers having handles at one end and cooperating gripping jaws at their other ends, a pin pivotally connecting said levers intermediate the ends thereof, and a rigid elongated holding member having a handle portion at its inner end and a pointed outer end portion adapted to be inserted into the throat of a fish, said holding member being connected intermediate its ends with said levers by said pivot pin for bodily longitudinal movement relatively to the gripping jaws of said clamping levers, said elongated holding member engaging said pivot pin between the pair of clamping levers and extending between the gripping jaws of said levers, said holding member having a longitudinal slot therein slidably engaging said pivot pin.

2. An implement for holding fish including a pair of clamping levers having handles at one end and cooperating griping jaws at their other ends, a pin pivotally connecting said levers intermediate the ends thereof, and a rigid elongated holding member having a handle portion at its inner end and a pointed outer end portion adapted to be inserted into the throat of a fish, said holding member being connected intermediate its ends with said levers by said pivot pin for bodily longitudinal movement relatively to the gripping jaws of said clamping levers, said elongated holding member having a longitudinal slot therein slidably engaging said pivot pin.

3. An implement for holding fish including a pair of clamping members pivotally connected intermediate their ends, said levers having handles at one end and cooperating clamping jaws at their other ends, one of said levers having at its fulcrum portion pins projecting from opposite sides thereof, each of said pins having an elongated head, the other lever having in its fulcrum portion an elongated aperture of a size corresponding to the size of the elongated head of one of said pins to permit said head to be passed therethrough, and to pivotally engage said pin, and a rigid elongated holding member having a handle portion at its inner end and a pointed outer end portion adapted to be inserted into the throat of the fish, and said holding member having a longitudinal slot therein intermediate its ends of a width corresponding to the width of the head of the other pin to permit said head to be passed through said slot, and to slidably engage said pin to provide for pivotal and bodily longitudinal movement of the elongated member relatively to the gripping jaws of the levers.

4. An implement for holding fish including a rigid elongated stem having a handle portion at its inner end and a pointed outer end portion adapted to be inserted into the throat of a fish, a cooperating manually operable clamping member, and means connecting said clamping member to said stem intermediate their ends for pivotal movement laterally toward and from each other and providing for bodily longitudinal movement of one of the members relatively to the other member, said connecting means comprising a pin and a longitudinal slot in said elongated stem member.

5. An implement for holding fish including a rigid elongated stem member having a handle portion at its inner end and a pointed outer end portion adapted to be inserted into the throat of the fish, a cooperating manually operable clamping member, and a pin and slot connection between said elongated stem and clamping member intermediate their ends providing for pivotal movement laterally of the clamping member toward and from said elongated stem and for bodily longitudinal movement of one of said members relatively to the other.

6. An implement for holding fish including a pair of clamping levers having handles at one end and cooperating gripping jaws at their other ends, a rigid elongated holding member having a handle portion at its inner end and a pointed outer end portion adapted to be inserted into the throat of the fish, and means pivotally connecting said levers intermediate their ends and connecting said holding member intermediate its ends with the clamping levers at the pivotal axis thereof for bodily sliding movement relatively to the gripping jaws of the clamping levers, said means including a pivot pin, and said holding member having a longitudinal slot therein slidably engaging said pin.

ALEXANDER F. SISKOFF.

REFERENCES CITED

The following references are of record in the file of this patent:

UNITED STATES PATENTS

| Number | Name | Date |
|---|---|---|
| 2,015,262 | Flagg et al. | Sept. 24, 1935 |
| 2,298,580 | Miron | Oct. 13, 1942 |
| 2,487,713 | Kroier | Nov. 8, 1949 |

FOREIGN PATENTS

| Number | Country | Date |
|---|---|---|
| 45,794 | Sweden | Sept. 20, 1919 |
| 605,774 | Germany | Nov. 17, 1934 |